(12) United States Patent
Prilutsky et al.

(10) Patent No.: US 9,093,726 B2
(45) Date of Patent: Jul. 28, 2015

(54) ACTIVE THERMAL RUNAWAY MITIGATION SYSTEM FOR USE WITHIN A BATTERY PACK

(75) Inventors: Alex Prilutsky, San Mateo, CA (US); Weston Arthur Hermann, Palo Alto, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 973 days.

(21) Appl. No.: 12/558,494

(22) Filed: Sep. 12, 2009

(65) Prior Publication Data

US 2010/0136391 A1    Jun. 3, 2010

(51) Int. Cl.

| H01M 10/50 | (2006.01) |
|---|---|
| H01M 10/613 | (2014.01) |
| H01M 10/63 | (2014.01) |
| H01M 10/6564 | (2014.01) |
| H01M 10/6567 | (2014.01) |
| G05D 23/12 | (2006.01) |
| H01M 10/625 | (2014.01) |
| H01M 10/643 | (2014.01) |
| H01M 10/6566 | (2014.01) |
| H01M 10/659 | (2014.01) |

(52) U.S. Cl.
CPC ........ *H01M 10/5004* (2013.01); *H01M 10/502* (2013.01); *H01M 10/5069* (2013.01); *H01M 10/5075* (2013.01); *G05D 23/123* (2013.01); *H01M 10/503* (2013.01); *H01M 10/5016* (2013.01); *H01M 10/5073* (2013.01); *H01M 10/5089* (2013.01)

(58) Field of Classification Search
CPC ..................... H01M 10/5002; H01M 10/5004; H01M 10/5063; H01M 10/5075; H01M 10/503; H01M 10/5016; H01M 10/5069; H01M 10/5073; H01M 10/5089; G05D 23/123
USPC .................................................... 429/120, 62
See application file for complete search history.

(56) References Cited

U.S. PATENT DOCUMENTS

| 5,607,787 A | 3/1997 | Wedlake et al. |
| 7,433,794 B1 | 10/2008 | Berdichevsky et al. |
| 7,698,078 B2 | 4/2010 | Kelty et al. |
| 7,736,799 B1 | 6/2010 | Hermann et al. |

(Continued)

FOREIGN PATENT DOCUMENTS

| JP | H0487266 A1 | 3/1992 |
| JP | H06349521 A | 12/1994 |

(Continued)

OTHER PUBLICATIONS

Machine Translation of JP 2008-251263 Shiegto et al.*

*Primary Examiner* — Milton I Cano
*Assistant Examiner* — Stephen Yanchuk
(74) *Attorney, Agent, or Firm* — J. Richard Soderberg

(57) ABSTRACT

An active thermal runaway mitigation system is provided that mitigates the effects of a single cell undergoing thermal runaway, thereby preventing the propagation of the thermal runaway event to neighboring cells within the battery pack. The provided system includes at least one, fluid-containing conduit in proximity to the cells within the battery pack. The conduit includes a plurality of breach points in proximity to the subset of cells, where each breach point is configured to form a breach at a preset temperature that is lower than the melting temperature of the conduit. Once a breach is formed, the fluid contained within the conduit is discharged through the breach.

28 Claims, 7 Drawing Sheets

(56) References Cited

U.S. PATENT DOCUMENTS

| | | |
|---|---|---|
| 7,749,647 B1 | 7/2010 | Hermann et al. |
| 7,749,650 B1 | 7/2010 | Hermann |
| 8,367,239 B2 | 2/2013 | Hermann |
| 2007/0009787 A1 | 1/2007 | Straubel et al. |
| 2007/0218353 A1 | 9/2007 | Straubel et al. |
| 2008/0251235 A1 | 10/2008 | Zhou |
| 2008/0312782 A1 | 12/2008 | Berdichevsky et al. |
| 2010/0136424 A1 | 6/2010 | Hermann et al. |
| 2010/0297513 A1* | 11/2010 | Yasuda et al. ............ 429/423 |
| 2011/0020676 A1* | 1/2011 | Kurosawa ............ 429/62 |

FOREIGN PATENT DOCUMENTS

| | | |
|---|---|---|
| JP | H09259938 A | 10/1997 |
| JP | 2008 251263 | 10/2008 |
| JP | 2009 009853 | 1/2009 |

\* cited by examiner

ACTIVE THERMAL RUNAWAY MITIGATION SYSTEM FOR USE WITHIN A BATTERY PACK

FIELD OF THE INVENTION

The present invention relates generally to batteries, and more particularly, to a means for mitigating the effects of thermal runaway within a battery pack.

BACKGROUND OF THE INVENTION

Batteries can be broadly classified into primary and secondary batteries. Primary batteries, also referred to as disposable batteries, are intended to be used until depleted, after which they are simply replaced with one or more new batteries. Secondary batteries, more commonly referred to as rechargeable batteries, are capable of being repeatedly recharged and reused, therefore offering economic, environmental and ease-of-use benefits compared to disposable batteries.

Although rechargeable batteries offer a number of advantages over disposable batteries, this type of battery is not without its drawbacks. In general, most of the disadvantages associated with rechargeable batteries are due to the battery chemistries employed, as these chemistries tend to be less stable than those used in primary cells. Due to these relatively unstable chemistries, secondary cells often require special handling during fabrication. Additionally, secondary cells such as lithium-ion cells tend to be more prone to thermal runaway than primary cells, thermal runaway occurring when the internal reaction rate increases to the point that more heat is being generated than can be withdrawn, leading to a further increase in both reaction rate and heat generation. Eventually the amount of generated heat is great enough to lead to the combustion of the battery as well as materials in proximity to the battery. Thermal runaway may be initiated by a short circuit within the cell, improper cell use, physical abuse, manufacturing defects, or exposure of the cell to extreme external temperatures.

During a thermal runaway event, a large amount of thermal energy is rapidly released, heating the entire cell up to a temperature of 900° C. or more. Due to the increased temperature of the cell undergoing thermal runaway, the temperature of adjacent cells within the battery pack will also increase. If the temperature of these adjacent cells is allowed to increase unimpeded, they may also enter into a state of thermal runaway, leading to a cascading effect where the initiation of thermal runaway within a single cell propagates throughout the entire battery pack. As a result, power from the battery pack is interrupted and the system employing the battery pack is more likely to incur extensive collateral damage due to the scale of thermal runaway and the associated release of thermal energy.

A number of approaches have been employed to either reduce the risk of thermal runaway, or reduce the risk of thermal runaway propagation. For example, by insulating the battery terminals and using specifically designed battery storage containers, the risk of shorting during storage and/or handling can be reduced. Another approach is to develop new cell chemistries and/or modify existing cell chemistries. Yet another approach, disclosed in co-pending U.S. patent application Ser. Nos. 12/504,712, 12/460,372, 12/460,342, 12/460,423 and 12/460,346, is to provide additional shielding at the cell level, thus inhibiting the flow of thermal energy from the cell undergoing thermal runaway to adjacent cells. Still yet another approach, disclosed in co-pending U.S. patent application Ser. No. 12/545,146, is to use a spacer assembly to maintain the position of the battery undergoing thermal runaway in its predetermined location within the battery pack, thereby helping to minimize the thermal effects on adjacent cells.

Accordingly, what is needed is a system that monitors the thermal behavior of the cells within a battery pack and, once thermal runaway is detected, mitigates the effects of this event in an attempt to prevent the initial thermal runaway event from propagating to neighboring cells within the battery pack. The present invention provides such a system.

SUMMARY OF THE INVENTION

An active thermal runaway mitigation system is provided that mitigates the effects of a single cell undergoing thermal runaway, thereby preventing the propagation of the thermal runaway event to neighboring cells within the battery pack. As a result, battery pack damage as well as collateral damage and personnel hazards are minimized.

The provided thermal runaway mitigation system is comprised of a battery pack enclosure, a plurality of cells contained within the enclosure, and at least one fluid-containing conduit in proximity to at least a subset of the plurality of cells. The conduit includes a plurality of breach points in proximity to the subset of cells, where each breach point is configured to form a breach at a preset temperature that is lower than the melting temperature of the conduit. Once a breach is formed, the fluid contained within the conduit is discharged through the breach. The preset temperature corresponds to a thermal runaway event or a precursor to a thermal runaway event. The breach points may be comprised of a thinned conduit wall region; alternately, of a conduit aperture and a plug within the aperture, the plug having a melting temperature that corresponds to the preset temperature; alternately, of a conduit aperture and a plug within the aperture, where a layer of a second material is interposed between the plug and the conduit aperture, and where the second material has a melting temperature that corresponds to the preset temperature. The fluid within the conduit may be comprised of a liquid, a gas, or an expanding fire retardant foam.

In at least one embodiment, the conduit of the thermal runaway mitigation system is coupled to a fluid pump. The conduit may also be coupled to a fluid reservoir. The fluid pump may be coupled to a system controller that cycles the fluid pump on/off at a predetermined frequency. The fluid pump may be coupled to a system controller that is also coupled to a fluid level sensor, wherein the system controller terminates fluid pump operation when the fluid level falls below a preset level. The fluid pump may be coupled to a system controller that is also coupled to at least one pressure sensor coupled to the conduit, wherein the system controller activates the fluid pump when the monitored pressure falls below a preset level. The fluid pump may be coupled to a system controller that is also coupled to at least one temperature sensor, wherein the system controller activates the fluid pump when the monitored temperature increases above a preset level.

In at least one embodiment, the conduit is coupled to a source of gas, for example a pressurized gas canister. The system may further comprise at least one pressure sensor coupled to the conduit, a gas valve coupled to the conduit and interposed between the gas source and the plurality of breach points, and a system controller that opens the gas valve when the monitored pressure falls below a preset level. The system may further comprise at least one temperature sensor, a gas valve coupled to the conduit and interposed between the gas source and the plurality of breach points, and a system controller that opens the gas valve when the monitored temperature increases above a preset level.

In at least one embodiment, an active battery cooling system is in thermal communication with the plurality of cells within the battery pack.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably and may refer to any of a variety of different cell chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within a single piece or multi-piece housing, the individual batteries electrically interconnected to achieve the desired voltage and capacity for a particular application. It should be understood that identical element symbols used on multiple figures refer to the same component, or components of equal functionality. Additionally, the accompanying figures are only meant to illustrate, not limit, the scope of the invention and should not be considered to be to scale. Accordingly, not all battery elements and/or battery pack elements are shown in the illustrations.

Figure 1:
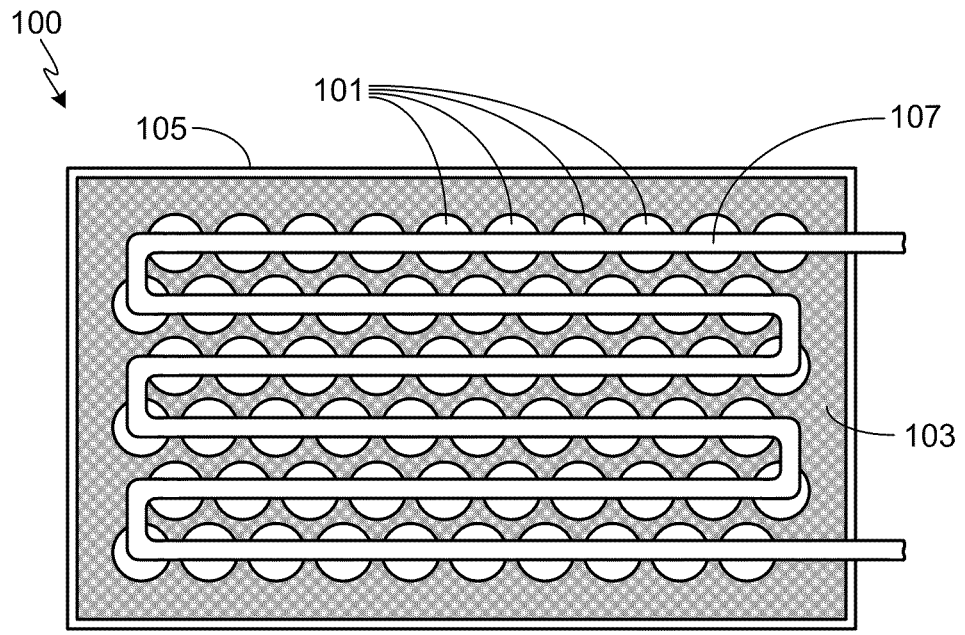
FIG. 1 schematically illustrates a battery pack utilizing a thermal runaway mitigation system in accordance with the invention.

FIG. 1 schematically illustrates a battery pack 100 utilizing a thermal runaway mitigation system in accordance with the invention. Batteries 101 within battery pack 100 are shown as having a cylindrical form, for example utilizing the 18650 form-factor, although it should be understood that the problems outlined below as well as the solutions offered by the present invention are equally applicable to both cylindrical batteries and those utilizing a different form-factor, e.g., pouch cells, rectangular cells, etc. It will also be appreciated that while battery pack 100 includes a few dozen cells, a battery pack may include as few as a couple of cells, or as many as hundreds or thousands of cells as in the battery packs used in hybrid and all-electric vehicles. Typically battery pack 100 uses one or more brackets, such as illustrated bracket 103, to hold the cells in place. The bracket(s) may be integral to the battery pack housing 105, or only an internal component thereof.

A variety of different abusive operating/charging conditions and/or manufacturing defects may cause a battery, such as those in battery pack 100, to enter into thermal runaway, where the amount of internally generated heat is greater than that which can be effectively withdrawn. As a result, a large amount of thermal energy is rapidly released, heating the entire cell up to a temperature of 900° C. or more and causing the formation of localized hot spots where the temperature may exceed 1500° C. Accompanying this energy release is the release of gas, causing the gas pressure within the cell to increase.

To combat the effects of thermal runaway, many conventional cells include a venting element within the cap assembly. The purpose of the venting element is to release, in a somewhat controlled fashion, the gas generated during the thermal runaway event, thereby preventing the internal gas pressure of the cell from exceeding its predetermined operating range. While the venting element of a cell may prevent excessive internal pressure, this element may have little effect on the thermal aspects of a thermal runaway event.

Once a cell begins to undergo thermal runaway, the thermal energy generated during this event may heat the adjacent cells to above their critical temperature, causing them to enter into thermal runaway. These cells, in turn, may heat additional cells to a sufficient temperature to cause them to enter into thermal runaway. Thus the occurrence of a single cell undergoing thermal runaway can initiate a cascading reaction that can spread throughout the entire battery pack. As a result, a large amount of heat is generated which, assuming the battery pack is used in an electric vehicle or similar application, may be confined to a relatively small region in close proximity to the vehicle's driver and passengers. Accordingly, it is critical that measures are taken to contain the thermal runaway event as soon as possible, therefore preventing the propagation of the initial event and mitigating its effects on the battery pack and its surroundings.

In accordance with the present invention, a conduit 107 is positioned in close proximity to each of the cells within the battery pack. As described further below, conduit 107 is filled with a fluid, e.g., a liquid or a gas. When a cell exceeds a preset temperature, thereby indicating the onset or existence of thermal runaway (depending upon the selected preset temperature), a breach is formed in the region of conduit 107 that is in close proximity to the over-heated cell. The gas or liquid contained within conduit 107 is then discharged through the breach onto the over-heated cell, thereby helping to cool the affected cell as well as stabilize the temperature of the nearby cells.

Figure 2:
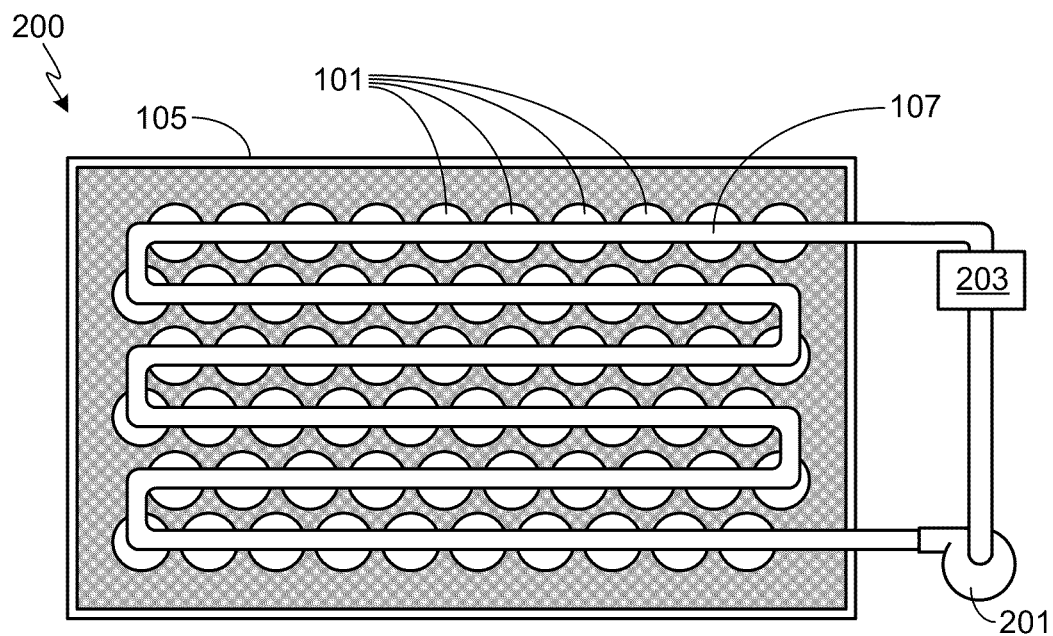
FIG. 2 illustrates the battery pack of FIG. 1 in which the thermal runaway mitigation system is coupled to a fluid pump and fluid reservoir.

In at least one embodiment, and as illustrated in FIG. 2, conduit 107 is filled with a liquid and coupled to a pump 201. Preferably the system also includes a fluid reservoir 203, fluid reservoir 203 ensuring that as the temperature of the fluid varies during normal operation, causing the fluid to undergo normal expansion and contraction cycles, that there is sufficient liquid within the system. Additionally, fluid reservoir 203 is sized to ensure that during a thermal runaway event, there is a large enough quantity of liquid to pump through one or more breach points for a sufficient amount of time so as to cool the batteries adjacent to those breach points from the maximum expected temperature during thermal runaway to at or below the normal operating temperature of the battery. For example, fluid reservoir is preferably sized to allow fluid to be pumped through the breach for at least 10 seconds, more preferably for at least 1 minute, and still more preferably for at least 10 minutes, and yet still more preferably for at least 15 minutes.

Figure 3:
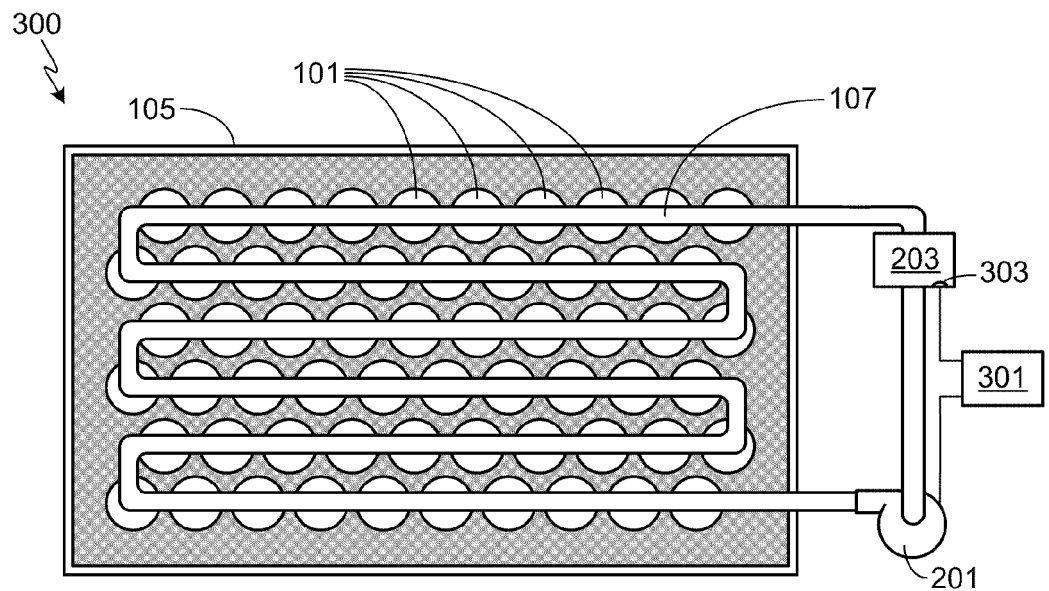
FIG. 3 illustrates the embodiment shown in FIG. 2, with the addition of a system controller.

FIG. 3 illustrates a modification of system 200. As shown, in system 300 pump 201 is coupled to a system controller 301. The use of a system controller allows the thermal runaway mitigation system of the invention to be operated in a more efficient manner. For example, in one configuration, instead of operating pump 201 continually, or continually while the system to which the battery pack is coupled is operating (e.g., hybrid or all-electric vehicle), system controller 301 is used to cycle pump 201 on and off at a predetermined cycle frequency. Cycling pump 201 helps to average out the temperature of the fluid within conduit 107, thus preventing the development of localized regions of high temperature, while minimizing pump use and improving system efficiency. In another configuration, system controller 301 is coupled to a fluid level sensor 303, sensor 303 imbedded within reservoir 203 as shown, or within a portion of conduit 107 (not shown). When the fluid level falls below a preset level as monitored by sensor 303, system controller 301 stops operation of pump 201. By stopping pump operation once the fluid level drops below the preset level, pump damage can be minimized if not altogether eliminated.

Figure 4:
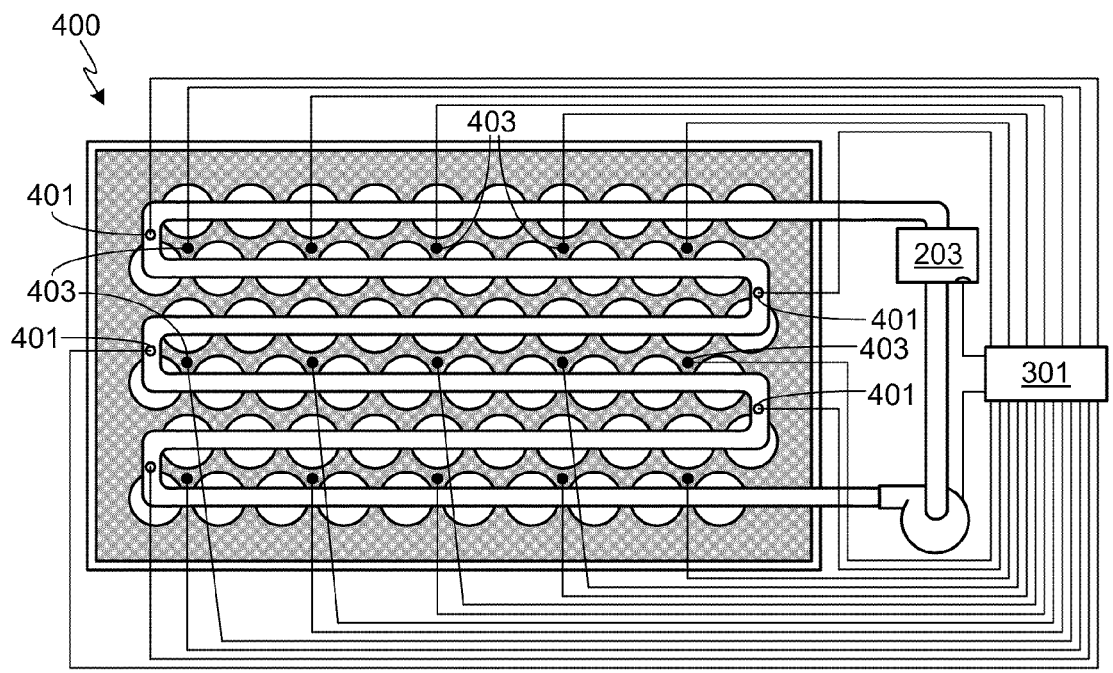
FIG. 4 illustrates the embodiment shown in FIG. 3, with the addition of pressure and temperature sensors.

If pump 201 is cycled rather than in continual operation, preferably means are included in the system to ensure that as soon as a breach in conduit 107 occurs, pump 201 immediately begins pumping fluid through the breach and onto the hot cell. Accordingly, and in at least one preferred embodiment of the invention and as illustrated in FIG. 4, system controller 301 is coupled to either one or more pressure sensors 401, or one or more temperature sensors 403, or both. When system controller 301 determines that a breach in conduit 107 has occurred, either by observing a drop in fluid pressure using sensor(s) 401 or a large increase in temperature using temperature sensor(s) 403, then it activates pump 201. Typically multiple temperature sensors 403 are required, scattered throughout the battery pack, in order to allow the occurrence of a thermal runaway event to be quickly assessed. Temperature sensors 403 may be located within conduit 107, proximate to conduit 107, or simply in proximity to the cells within battery pack 107. If system 400 uses pressure sensors, typically multiple pressure sensors 401 are located throughout conduit 107, the number being dependent upon the length and inside diameter of conduit 107, thus allowing rapid sensing of a conduit breach. In the illustrated embodiment, five pressure sensors 401 and fifteen temperature sensors 403 are shown.

As previously noted, the invention can use either a gas or a liquid to cool a cell undergoing thermal runaway and to mitigate its effects. In the embodiment illustrated in FIG. 5, conduit 107 is coupled to a source 501 of a suitable gas, e.g., a fire retardant that preferably has a relatively high heat capacity, thus allowing it to absorb some of the thermal energy generated by the cell undergoing thermal runaway. Preferably in this embodiment source 501 is a pressurized canister of the selected gas. As the system is under pressure, when a breach occurs gas from canister 501 is automatically discharged through the breach.

Figure 6:
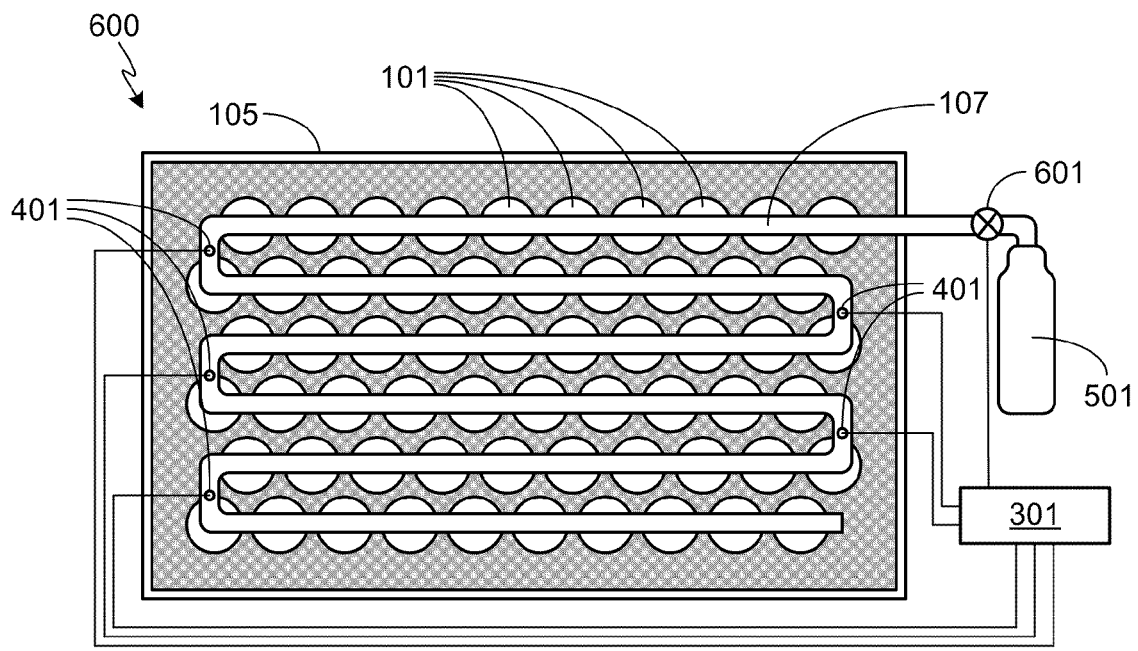
FIG. 6 illustrates the embodiment shown in FIG. 5, with the addition of a system controller and flow valve.

In a modification of system 500 shown in FIG. 6, the system is kept under pressure, albeit a low pressure, i.e., just above ambient pressure. When system controller determines that a breach in conduit 107 has occurred, due to a rapid change in pressure within the conduit as monitored by sensor or sensors 401, then a valve 601 is opened. Opening valve 601 couples high pressure gas source 501 to conduit 107. System 600 offers several advantages over system 500. First, by including valve 601 between gas source 501 and conduit 107 the system, including conduit 107 and the breaching means included therein are routinely subjected to a much lower pressure. As a result, the risk of system failures, e.g., system leaks, as well as the risk of a premature breach, are substantially reduced. Second, by monitoring system pressure via sensors 401, system controller 301 is able to distinguish between a reduction in pressure due to a gradual leak versus one due to a conduit breach arising from a thermal runaway event. It will be appreciated that system 600 may also use temperature sensors, e.g., sensors 403, to determine when to open valve 601 (not shown in system 600).

In a minor modification of systems 500 and 600, the fire retardant gas is replaced with a fire retardant aerosol that, upon discharge and exposure to air and/or heat, forms an expanding fire retardant foam. Preferably the expanding fire retardant foam is quick setting and biologically inert. In an exemplary embodiment, the fire retardant aerosol is an intumescent material, for example one based on the chemistry of an expandable graphite.

In the previously described embodiments, system controller 301 is used to monitor various aspects of the system (e.g., battery temperature, conduit pressure, reservoir fluid level, etc.) as well as control the system discharge by controlling pump 201 or the output of canister 501. It should be understood that system controller 301 may also be used to control other aspects of the system's response to a thermal runaway event. For example, in system 700 illustrated in FIG. 7, system controller 301 is coupled to a warning indicator 701 that provides a visual or audible indicator, or both, of a detected battery thermal event. Indicator 701 may be activated upon initial event detection, and/or upon operation of pump 201, and/or upon opening of valve 601. In an exemplary embodiment in an electric vehicle, indicator 701 may be an indicator light mounted in an instrument cluster on the dashboard and/or a sound generator coupled to, or separate from, the vehicle's audio system. System controller 301 may also be coupled to means 703 for modifying operation of the battery pack, for example by electrically disconnecting the module of the battery pack that has experienced the thermal runaway event or by modifying the load placed on the battery pack. System controller 301 may also be coupled to an on-board communication system 705 that reports thermal runaway events and/or operation of the thermal runaway mitigation system to the end user and/or a service provider (e.g., electric vehicle's dealership) and/or an emergency service provider (e.g., towing/repair service/fire department). Exemplary vehicle communication systems are given in co-pending U.S.

patent application Ser. No. 11/818,838, filed Jun. 15, 2007 and application Ser. No. 11/779,678, filed Jul. 18, 2007, the disclosures of which are incorporated herein for any and all purposes. It should be understood that warning indicator 701, battery pack modifying means 703, and/or communication system 705 may be coupled to the system controller in any of the previously disclosed embodiments of the invention.

Figure 5:
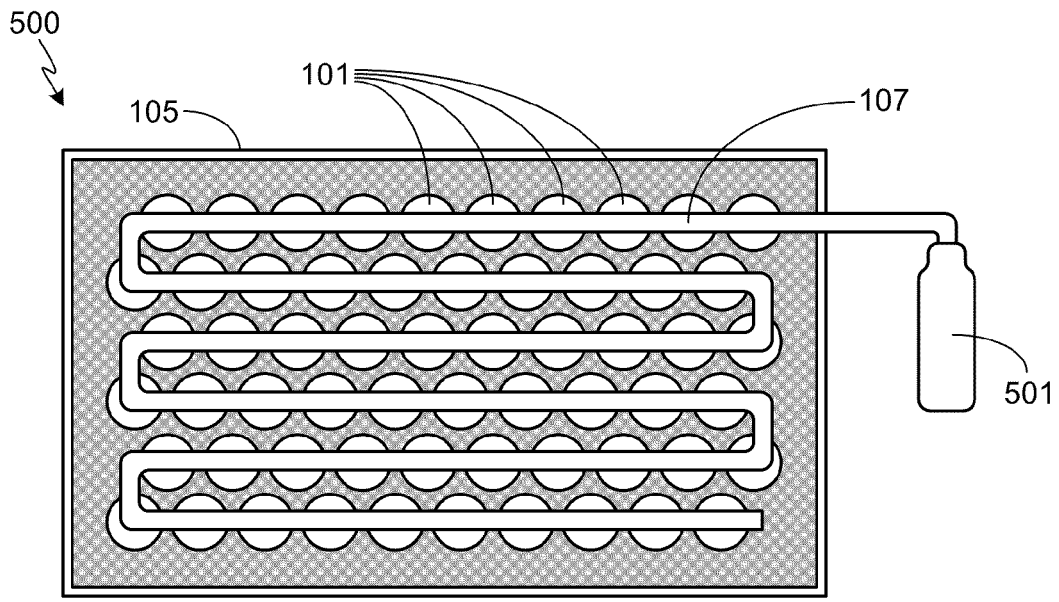
FIG. 5 illustrates an embodiment of the invention in which the thermal runaway mitigation system is coupled to a gas source.
Figure 7:
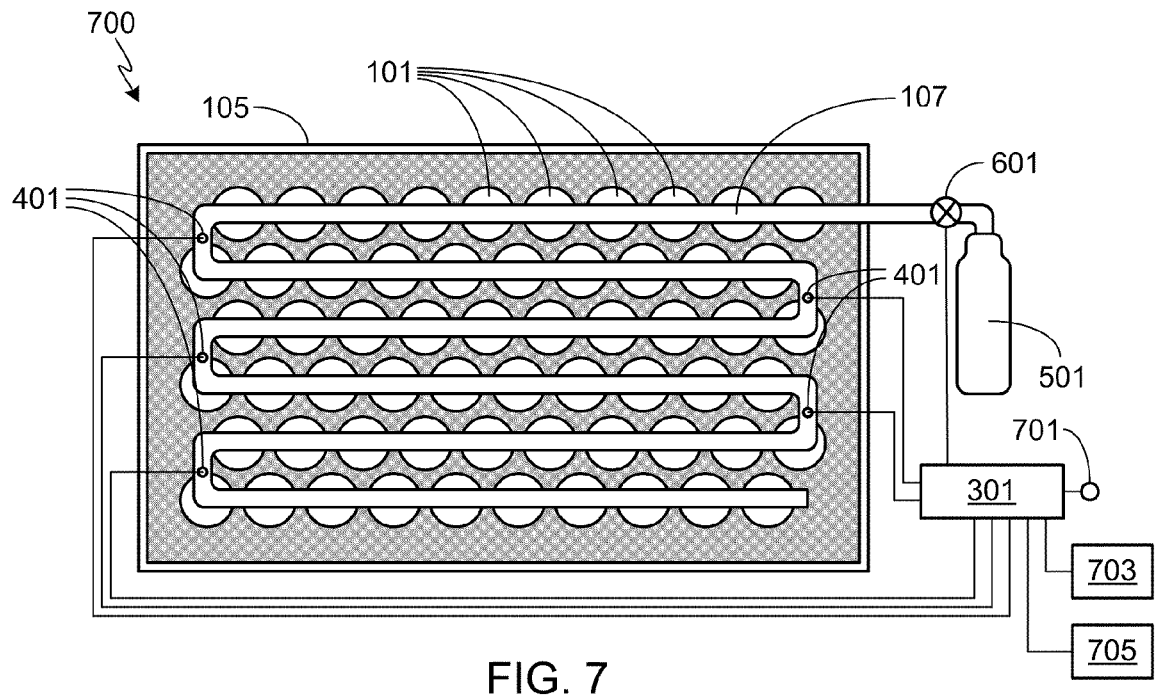
FIG. 7 illustrates a modification of the embodiment shown in FIG. 6.

In some embodiments of the invention, the thermal runaway mitigation system and the battery cooling system utilize the same conduits, heat transfer fluid, and coolant pump. Accordingly it will be appreciated that not all of the thermal runaway mitigation systems described above are suitable of use in such a dual capacity role. For example, embodiments using a canister of gas or an expandable fire retardant foam such as those shown in FIGS. 5-7 are clearly inappropriate since these embodiments do not circulate a cooling fluid and may be configured to only operate when a thermal runaway event occurs. Similarly, an embodiment in which pump 201 is only operated during a thermal runaway event will not meet the requirements of a battery cooling system. Accordingly, if the thermal runaway mitigation system is also performing the functions of a battery cooling system, then preferably an embodiment such as that shown in FIG. 2 or 3 is used. In such an embodiment, pump 201 operates in accordance with the requirements of the battery cooling system.

Figure 8:
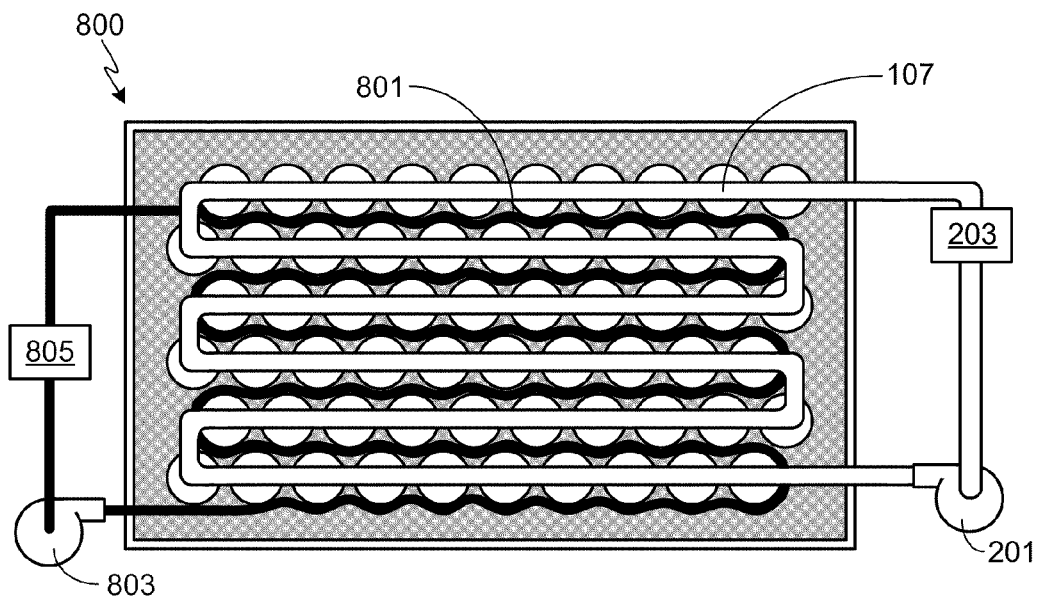
FIG. 8 illustrates the embodiment shown in FIG. 2, with the addition of a battery cooling system.

In some embodiments of the invention, the thermal runaway mitigation system is used in conjunction with a separate and independent battery cooling system. Although any of the previously described mitigation systems may be used in conjunction with a separate battery cooling system, in system 800 (FIG. 8) the thermal runaway mitigation system is based on system 200. The battery cooling system in this embodiment includes a coolant conduit 801, coolant pump 803, and coolant reservoir 805.

Conduit 107 of the thermal runaway mitigation system of the invention is not restricted to a specific and/or single position within the battery pack. Rather, conduit 107 is preferably positioned relative to the cells to achieve optimal mitigation performance when the fluid, liquid or gas, is discharged from the conduit during a thermal event. Therefore conduit 107 is preferably located adjacent to the most likely area for the cells to rupture and/or develop hot spots. Accordingly, if the cells have a vent located on the cell cap surface(s), preferably conduit 107 is positioned adjacent to the cell cap surface(s) of each cell. Alternately, the optimal position may be adjacent to the side surface of the cells. Additionally, it is preferred that conduit 107 be positioned to take advantage of gravity during fluid discharge, specifically using gravity to cause the fluid to cover more of the affected cell as it runs down the sides of the cell after the fluid's initial discharge. Accordingly, it at least one embodiment conduit 107 is positioned on top of the cells, or near the upper portion of the cells, where "top" and "upper portion" are defined in this instance by the expected position of the cells during use.

In the embodiments illustrated in FIGS. 1-8, a single conduit 107 is shown positioned adjacent to each cell 101. It should be understood, however, that the thermal runaway mitigation system of the invention may use multiple conduits in order to place more than one conduit in proximity to a cell/cell surface. A multi-conduit approach is typically preferred for a battery pack utilizing a large area cell, e.g., a large area pouch cell. In at least one embodiment, conduit 107 is non-cylindrically shaped, for example having a rectangular cross-section, thus allowing a single conduit to position multiple breach points near each cell.

Figure 9:
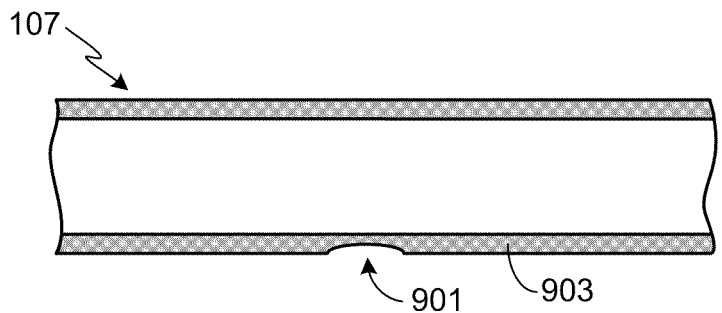
FIG. 9 is a cross-sectional view of a portion of a conduit for use with the thermal runaway mitigation system of the invention.
Figure 10:
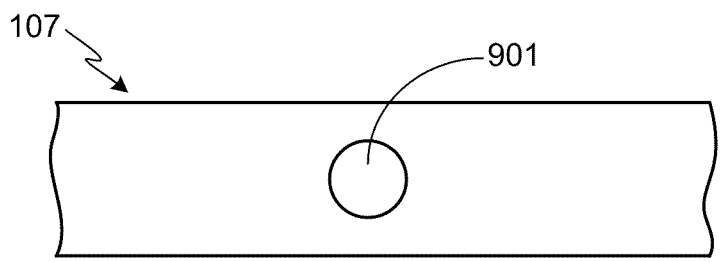
FIG. 10 provides an outside view of the portion of conduit shown in FIG. 9, including the thinned wall region comprising the breach point.

The inventors envision that a variety of different techniques can be used to create the breach points within conduit 107. The breach points are used to achieve optimal placement of the discharge fluid during a thermal runaway event. In one embodiment, the breach points are formed within the conduit by thinning a region of the conduit wall in the desired locations. FIGS. 9 and 10 provide a cross-sectional view and an outer view, respectively, of a portion of conduit 107 in which a breach point 901 has been created by thinning the conduit wall 903. As shown in FIG. 10, preferably the dimple or depression formed in conduit 107 at breach point 901 has an elliptical or circular form.

Figure 11:
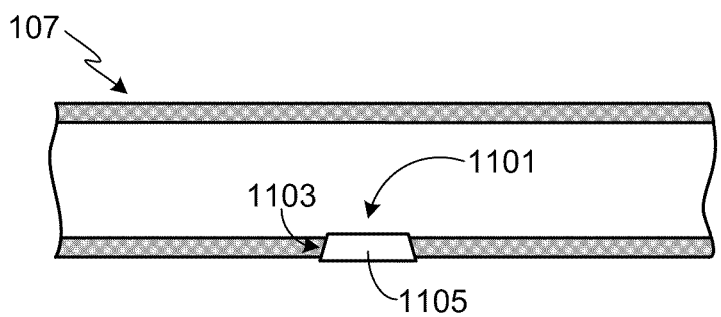
FIG. 11 is a cross-sectional view of a portion of a conduit using a plug at the breach point.
Figure 12:
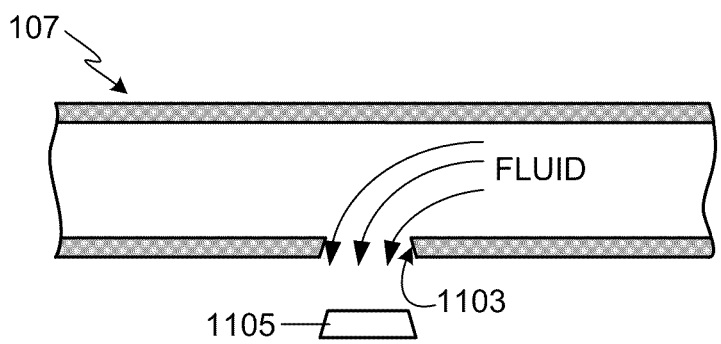
FIG. 12 is an illustration of the conduit shown in FIG. 11 with the plug forced out during a thermal runaway event.

In an alternate approach shown in FIG. 11, breach point 1101 in conduit 107 is created by filling an aperture 1103 within the conduit with a plug 1105. Plug 1105 is formed of a material with a lower melting point than conduit 107. When the battery that is adjacent to breach point 1101 heats up during a thermal runaway event, plug 1105 begins to melt before conduit 107 is affected. Then, as shown in FIG. 12, the pressure of the fluid (liquid or gas) within conduit 107 causes plug 1105 to be expelled from conduit aperture 1103, thereby allowing fluid within conduit 107 to be discharged through aperture 1103.

Figure 13:
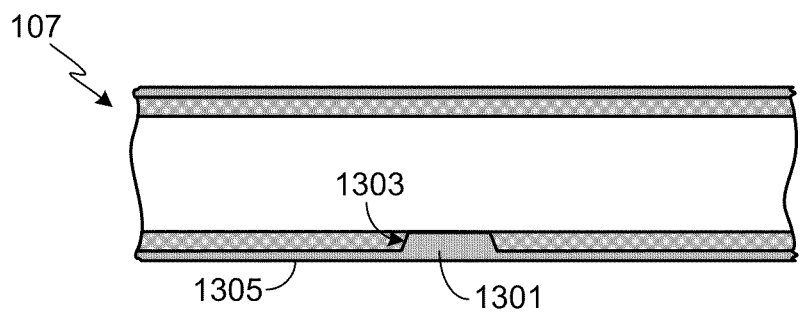
FIG. 13 is a cross-sectional view of a portion of a conduit with a coating that forms the breach plug.

In at least one embodiment and as shown in FIG. 13, plug 1301 is formed by first creating aperture(s) 1303 within conduit 107, then at least partially coating conduit 107 with a material 1305 that has a lower melting temperature than conduit 107. Material 1305 may also coat the outside surface of conduit 107 as shown. Preferably material 1305 is prevented from coating the inside surface of conduit 107, for example by placing a post-like structure within conduit 107 during the coating step, thereby preventing material 1305 from entering through aperture 1303 into conduit 107. Alternately, any material 1305 that does enter through aperture 1303 during coating may be removed after the coating step, for example by running a boring and/or cleaning tool through conduit 107 prior to its use within a battery pack.

Figure 14:
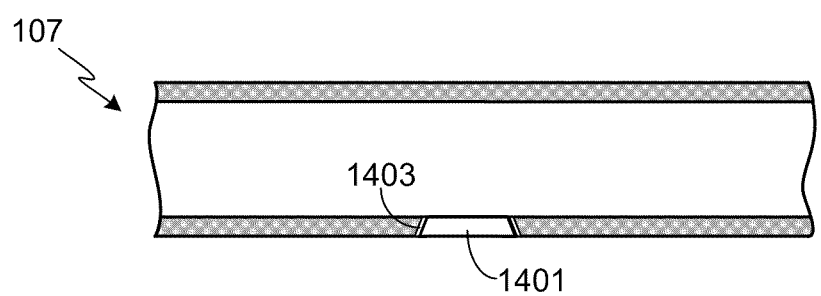
FIG. 14 is a cross-sectional view of a portion of a conduit with a low melting point layer separating the breach point aperture and the plug.

In an alternate breach plug configuration, and as shown in FIG. 14, the breach point in conduit 107 is created by filling the aperture within the conduit with a plug 1401 of a second material. Around the outer edge of plug 1401, and separating plug 1401 from the conduit aperture, is a third material layer 1403. Plug 1401 may be formed of the same material, or a different material, from the material comprising conduit 107. Material layer 1403 is formed of a material with a lower melting point than either conduit 107 or plug 1401. Due to the lower melting temperature of layer 1403, during a thermal runaway event it begins to melt before either plug 1401 or conduit 107. As a result, plug 1401 is rapidly expelled during thermal runaway, typically before it melts.

Although not shown, it will be appreciated that a spring or similar mechanism can be coupled to the breach plug, thereby promoting its expulsion during a thermal runaway event.

Figure 15:
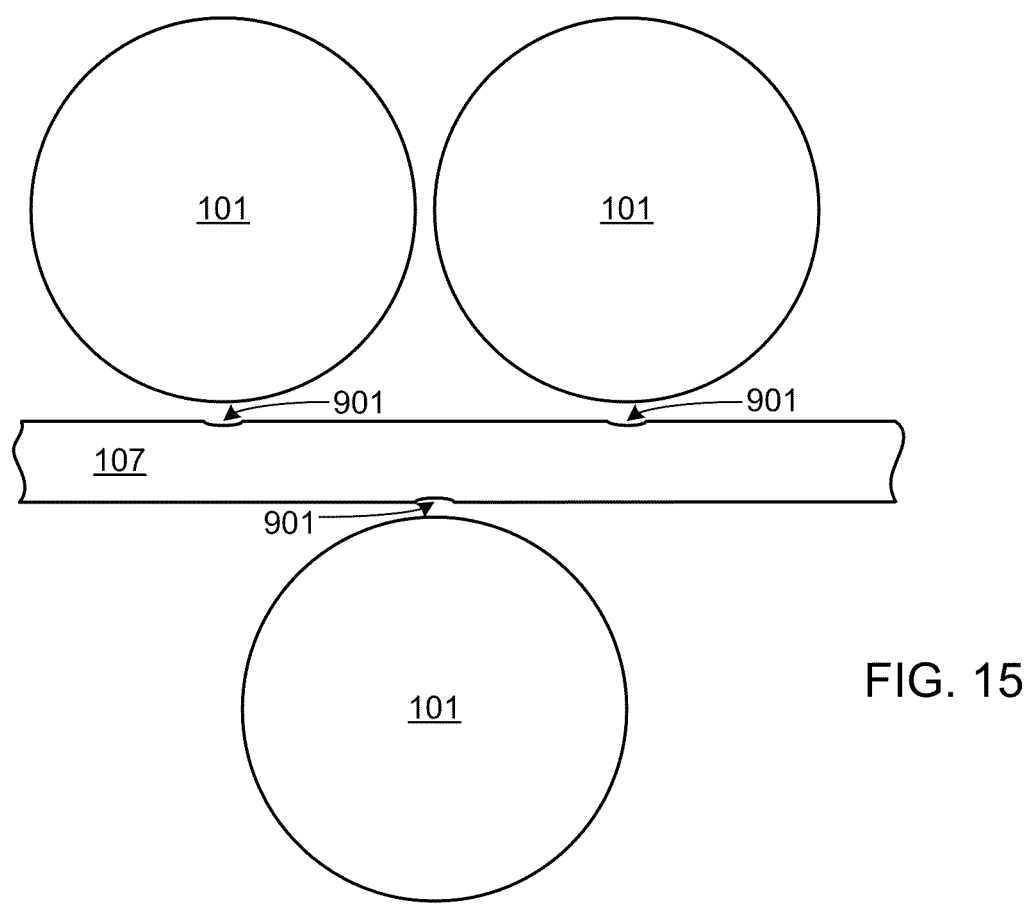
FIG. 15 illustrates the use of a single conduit with multiple breach points.
Figure 16:
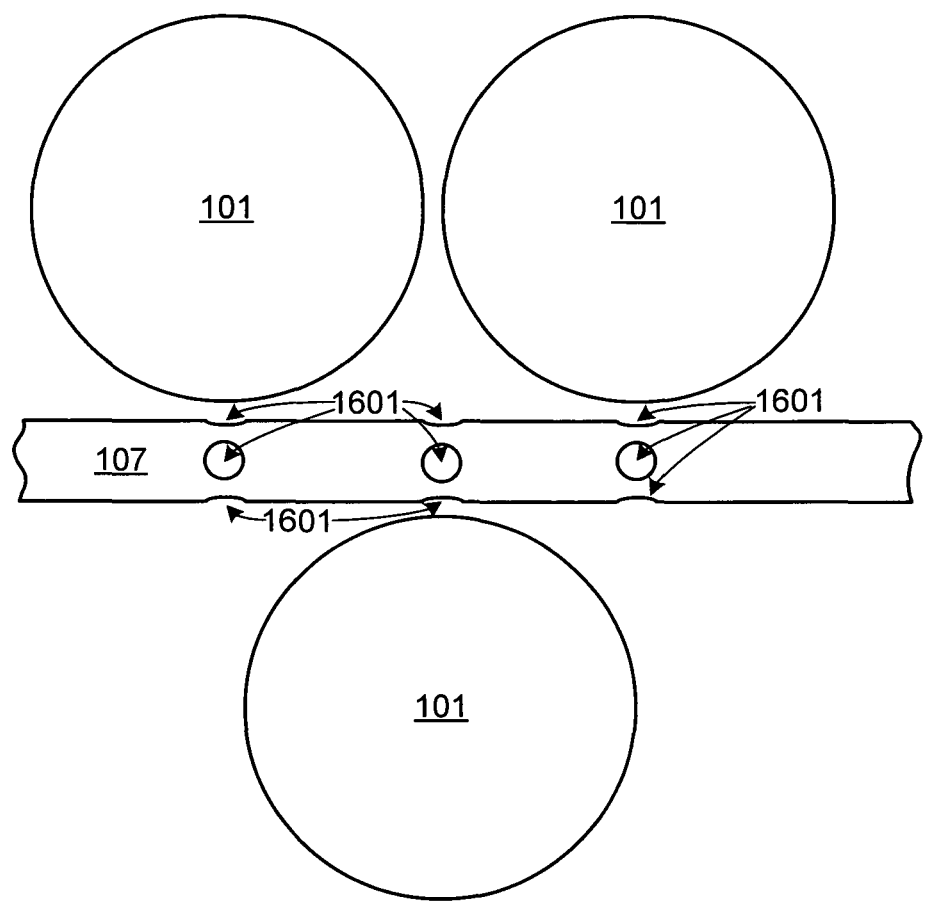
FIG. 16 illustrates a position tolerant conduit utilizing multiple breach points located around its periphery.

It should be understood that in those embodiments in which a conduit is located between adjacent cell rows, as opposed to being located on top of the cells, the conduit can include breach points on either side of the conduit. For example, and as shown in FIG. 15, conduit 107 between cells 101 includes breach points 901 located on either side of the conduit. The placement of breach points on multiple sides of conduit 107 may be used with any type of breach point/plug, e.g., breach point 901 or plugs 1105, 1301 and 1401. Additionally, in at least one embodiment of the invention, sufficient breach points/plugs are included in conduit 107 to minimize the effects of conduit placement on its performance. For example, in FIG. 16 conduit 107 includes many breach points 1601 surrounding its periphery, thereby making it less position sensitive relative to the cell locations.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A thermal runaway mitigation system, comprising:
a battery pack enclosure;
a plurality of cells contained within said battery pack enclosure;
at least one conduit in proximity to at least a subset of said plurality of cells, wherein said at least one conduit is comprised of a material with a first melting temperature;
a fluid contained within said at least one conduit;
a plurality of breach points within said at least one conduit, wherein said plurality of breach points are in proximity to said subset of said plurality of cells, and wherein each of said plurality of breach points is configured to form a breach at a preset temperature, wherein said preset temperature is lower than said first melting temperature, and wherein a portion of said fluid is discharged through said breach when said breach is formed at said preset temperature;
a fluid reservoir coupled to said at least one conduit;
a fluid pump coupled to said at least one conduit, wherein said fluid pump pumps said fluid from said fluid reservoir through said conduit;
a fluid pump activation subsystem comprising at least one pressure sensor, wherein said at least one pressure sensor monitors a fluid pressure within said at least one conduit and outputs a pump activation signal when said fluid pressure falls below a preset pressure, wherein said fluid pressure falling below said preset pressure is indicative of said breach forming within said at least one conduit; and
a system controller coupled to said fluid pump and to said at least one pressure sensor, wherein said system controller is programmed to activate said fluid pump in response to said system controller receiving said pump activation signal from said at least one pressure sensor when said fluid pressure falls below said preset pressure.

2. The thermal runaway mitigation system of claim 1, wherein said preset temperature corresponds to a thermal runaway event.

3. The thermal runaway mitigation system of claim 1, wherein said preset temperature corresponds to a precursor to a thermal runaway event.

4. The thermal runaway mitigation system of claim 1, wherein each of said plurality of breach points comprise a region of thinned conduit wall.

5. The thermal runaway mitigation system of claim 1, wherein each of said plurality of breach points comprise a conduit aperture and a plug within said conduit aperture, wherein said plug has a melting temperature corresponding to said preset temperature.

6. The thermal runaway mitigation system of claim 1, wherein each of said plurality of breach points comprise a conduit aperture, a plug within said conduit aperture, and a layer of a second material interposed between said conduit aperture and an outer surface of said plug, wherein said second material has a melting temperature corresponding to said preset temperature.

7. The thermal runaway mitigation system of claim 6, wherein said plug has a melting temperature greater than said second material.

8. The thermal runaway mitigation system of claim 1, wherein after activation of said fluid pump, said system controller cycles said fluid pump on/off at a predetermined frequency.

9. The thermal runaway mitigation system of claim 1, further comprising a fluid pump de-activation subsystem comprising at least one fluid level sensor coupled to said fluid reservoir, wherein said at least one fluid level sensor monitors a fluid level within said fluid reservoir and outputs a pump de-activation signal when said fluid level falls below a preset level, wherein said system controller is coupled to said at least one fluid level sensor, wherein said system controller de-activates said fluid pump when said system controller receives said pump de-activation signal from said at least one fluid level sensor.

10. The thermal runaway mitigation system of claim 1, further comprising at least one temperature sensor, wherein said at least one temperature sensor monitors a temperature within said battery pack enclosure and outputs a signal when said temperature exceeds a preset activation temperature, wherein said system controller is also programmed to activate said fluid pump in response to said signal.

11. The thermal runaway mitigation system of claim 10, wherein the temperature sensor is positioned within the conduit.

12. The thermal runaway mitigation system of claim 10, wherein the temperature sensor is positioned proximate at least some of the cells.

13. The thermal runaway mitigation system of claim 1, wherein the cells have a cylindrical form factor and are held in place within the battery pack enclosure by one or more brackets.

14. The thermal runaway mitigation system of claim 1, wherein the conduit is positioned in close proximity to all of the plurality of cells.

15. The thermal runaway mitigation system of claim 1, wherein the fluid reservoir is sized so that during a thermal runaway event, there is a large enough quantity of the fluid to pump through the breach for a predetermined amount of time.

16. The thermal runaway mitigation system of claim 1, wherein the system controller is further programmed to distinguish between a gradual leak and a thermal runaway event.

17. The thermal runaway mitigation system of claim 1, wherein the system controller is further programmed to electrically disconnect a module of the battery pack enclosure upon a thermal runaway event.

18. The thermal runaway mitigation system of claim 1, wherein the system controller is further programmed to report a thermal runaway event to an emergency service provider.

19. The thermal runaway mitigation system of claim 1, further comprising a battery cooling system that also uses the conduit, the fluid and the fluid pump.

20. The thermal runaway mitigation system of claim 1, wherein the battery pack enclosure further comprises a battery cooling system that uses a coolant conduit separate from the conduit, a coolant pump separate from the fluid pump, and a coolant reservoir separate from the fluid reservoir.

21. The thermal runaway mitigation system of claim 1, wherein the conduit is positioned near an upper portion of the plurality of cells, so as to take advantage of gravity during fluid discharge.

22. The thermal runaway mitigation system of claim 21, wherein the conduit is positioned adjacent cell cap surfaces of the plurality of cells.

23. The thermal runaway mitigation system of claim 1, wherein the conduit is positioned adjacent side surfaces of the plurality of cells.

24. The thermal runaway mitigation system of claim 1, wherein the conduit is proximate to each of the plurality of cells.

25. The thermal runaway mitigation system of claim 1, further comprising multiple conduits adjacent each of the plurality of cells.

26. The thermal runaway mitigation system of claim 1, wherein the conduit is positioned between adjacent rows of the plurality of cells.

27. The thermal runaway mitigation system of claim 26, wherein the breach points are positioned on either side of the conduit, facing the adjacent rows of the plurality of cells.

28. A thermal runaway mitigation system comprising:
- a battery pack enclosure;
- a plurality of cells contained within said battery pack enclosure;
- at least one conduit in proximity to at least a subset of said plurality of cells, wherein said at least one conduit is comprised of a material with a first melting temperature;
- a pressurized source of gas coupled to said at least one conduit;
- a plurality of breach points within said at least one conduit, wherein said plurality of breach points are in proximity to said subset of said plurality of cells, and wherein each of said plurality of breach points is configured to form a breach at a preset temperature, wherein said preset temperature is lower than said first melting temperature, and wherein a portion of said gas is discharged through said breach when said breach is formed at said preset temperature;
- an activation subsystem comprising at least one pressure sensor coupled to said conduit, wherein said at least one pressure sensor monitors a gas pressure within said at least one conduit and outputs a valve open signal when said gas pressure falls below a preset pressure;
- a gas valve coupled to said conduit and interposed between said pressurized source of gas and said at least one conduit; and
- a system controller coupled to said at least one pressure sensor and to said gas valve, wherein said system controller is programmed to open said gas valve and release gas from said pressurized source of gas into said conduit in response to said system controller receiving said valve open signal from said at least one pressure sensor when said gas pressure falls below said preset pressure.

* * * * *